United States Patent [19]
Putt

[11] 4,396,874
[45] Aug. 2, 1983

[54] MAGNETIC APPARATUS FOR PRODUCING MOVEMENT

[76] Inventor: J. William Putt, 1162M S. Cedar Crest Blvd., Allentown, Pa. 18103

[21] Appl. No.: 344,270

[22] Filed: Jan. 28, 1982

[51] Int. Cl.³ .............................................. H02K 33/16
[52] U.S. Cl. .................................... 318/122; 318/135; 318/119; 310/30
[58] Field of Search ................ 318/135, 134, 121–123, 318/126, 129, 119, 442, 686–687; 310/30, 34

[56] References Cited
U.S. PATENT DOCUMENTS

| | | | |
|---|---|---|---|
| 3,931,554 | 1/1976 | Spentzas | 318/122 |
| 4,012,675 | 3/1977 | Schulze, Jr. | 318/134 |
| 4,249,115 | 2/1981 | Putt | 310/34 |
| 4,340,846 | 7/1982 | Putt | 318/135 |

*Primary Examiner*—J. V. Truhe
*Assistant Examiner*—A. Evans
*Attorney, Agent, or Firm*—Beveridge, DeGrandi & Kline

[57] ABSTRACT

Apparatus for providing movement includes an electromagnet. The time required to attain a given value of current flow in a magnet coil is shortened by initially providing a higher voltage to attain quickly the desired current flow, and then providing a lower voltage.

7 Claims, 5 Drawing Figures

MAGNETIC APPARATUS FOR PRODUCING MOVEMENT

BACKGROUND OF THE INVENTION

This invention relates to machines for producing movement between two paramagnetic members, one of which is an electromagnet. A specific machine of this type, referred to herein as applicant's earlier machine is disclosed in copending U.S. patent application Ser. No. 217,928 filed Dec. 18, 1980. The entire disclosure of this copending patent application is incorporated herein by reference.

An objective of this invention is to provide a highly efficient machine which is capable of operating at a high speed.

It has been found that the speed at which applicant's earlier machine operates cannot be increased without raising the voltage of the energizing power source. The operating speed has been found to be directly proportional to the voltage applied. When twelve volts were applied, the speed was one stroke per two seconds, and when twenty four volts were applied the speed was one stroke per second.

The behavior described in the preceding paragraph is attributable to the fact that the current flowing in the electromagnet windings did not immediately flow at the desired rate to produce an appropriate magnetomotive force. The current flow with respect to time followed an exponential curve wherein, when $t_{max}$ is the time required to reach the maximum current for the respective voltage and resistance, only 63.2% of the maximum current would flow at 0.25 of $t_{max}$. When a potential of twelve volts was applied to a one ohm electromagnet coil, the current rose quickly to five or six amperes and then slowly rose to the maximum rate of twelve amperes. When twenty four volts were applied to the same coil, the current quickly rose to about twelve amperes and then slowly rose to twenty four amperes. When 120 volts are applied to a one ohm coil, twelve amperes will flow in only 0.079 second.

According to one aspect of the present invention, a machine is made to operate at a higher speed by shortening the time period required to establish the desired rate of current flow in an electromagnet. This is done by initially energizing the magnet with a higher voltage to achieve a rapid current increase, and then applying a lower voltage to maintain the current.

It has also been observed that when the windings of an electromagnet comprise two or more independently energizable coils, the time required to reach the maximum current flow in one coil, for a given voltage and coil resistance, can be shortened if the other coil already has current flowing therein.

Taking advantage of this principle, the invention also relates to a machine of the character described wherein the windings of an electromagnet include at least two coils. One coil is given a higher voltage at the commencement of the cycle to provide a rapid current rise, and another coil is given a lower voltage which quickly produces therein the maximum current for its respective resistance and voltage.

SUMMARY OF THE INVENTION

According to the invention, an apparatus for producing movement includes at least two paramagnetic members which are relatively movable from mutually distant positions to mutually proximate positions, the members being separated by a gap which opens and closes as the members move relatively away from and toward each other. One of the paramagnetic members is provided with electrical windings which include an electrical coil which is energized to cause an electrical current to flow therethrough thereby creating a magnetomotive force in the respective paramagnetic member. Means are provided for applying a first electrical potential to the coil for a limited period of time which is less than the time required to establish a current of $I_{max}=E_1/R_1$ wherein $E_1$ is the first electrical potential and $R_1$ is the electrical resistance of the coil. After the flow of current is established, a second electrical potential is applied to the coil, the second electrical potential being less than the first electrical potential and being effective to maintain the flow of current in the coil.

The invention also relates to apparatus for producing movement wherein first and second coils are provided on a paramagnetic member which is relatively movable with respect to another paramagnetic member, the coils being energizable to provide a magnetic field which pulls the paramagnetic members together and closes a gap which is provided between them. The energizing means for applying electrical potentials to the windings includes means for applying a first electrical potential to a first coil to produce the flow of electric current therethrough. Means are provided for applying a second electrical potential to the second coil. The second electrical potential is less than the first electrical potential, and the effect of the first electrical potential is to shorten the time required for the current in the second coil to reach a given value.

Preferably, the energizing means of the apparatus includes at least a first electrical source and a second electrical source. The first electrical potential is applied by connecting the first and second electrical sources in series to the first coil, and the second electrical potential is applied by connecting the sound coil in parallel to at least one of the electrical sources. In this connection, the means for applying the first electrical potential to the first coil is operable for a time interval which is less than the time required to establish in the first coil a current of $I_{max}=E_1/R_1$ wherein $E_1$ is the first electrical potential and $R_1$ is the electrical resistance of the coil.

Additional aspects and features of the invention will be appreciated from the following descriptive materials.

DESCRIPTION OF THE PREFERRED EMBODIMENT

Figure 1:
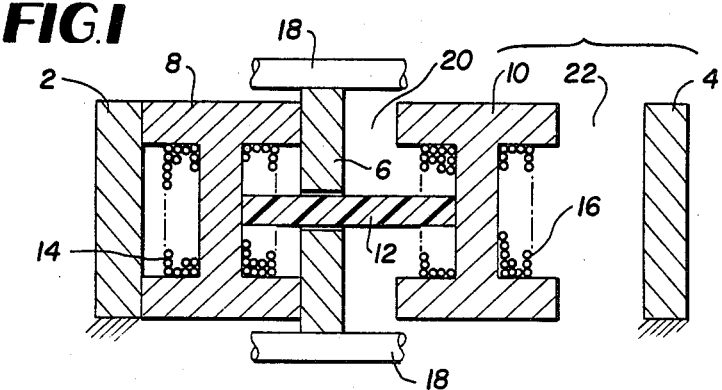
FIG. 1 is a diagrammatic view of an apparatus which embodies the invention at the leftward extremety of its travel.

One machine to which the invention is applicable is shown in FIG. 1. The apparatus includes five paramagnetic members of which the outermost members 2 and 4 are stationary reactors, the central member 6 is a longitudinally movable reactor and the intermediate members 8 and 10 are electromagnets. The term "reactor" is used to describe a passive paramagnetic member, i.e. a member which is susceptible to magnetic attraction but does not itself create a magnetic field.

The electromagnets 8 and 10 are relatively movable in an axial direction with respect to the members 2, 4 and 6 and they are rigidly connected together for concurrent movement by a nonmagnetic connector bar 12. The electromagnets are formed of H-shaped paramagnetic cores of commercially available special magnetic alloys, wound with windings 14 and 16 which are energized so that the apparatus shifts back and forth between the left position illustrated in FIG. 1 and a right position which is a mirror image of FIG. 1, thereby causing a reciprocating movement of the central member 6. The reciprocating movement of driven member 6 is transmitted by crosshead shafts 18 or other suitable connections to a hydraulic pump or other device for utilizing a mechanical input motion.

The windings 14 and 16 of the electromagnets are energized at different times. That is, the windings 14 of electromagnet 8 are energized at one phase of the cycle to create magnetic attraction between the members 2, 6 and 8, moving the driven central member 6 to the left position shown in FIG. 1. During the other phase of a cycle, the windings 14 of electromagnet 8 are deenergized and the windings 16 of electromagnet 10 are energized, causing the members 6, 10 and 4 to be drawn together by magnetic attraction to produce a rightward motion. After this motion is completed, the windings 16 of electromagnet 10 are deenergized and the windings 14 of electromagnet 8 are energized, causing the apparatus to return to the FIG. 1 position.

In the position shown in FIG. 1, there is a first gap 20 between the members 6 and 10 and a second gap 22 between the members 4 and 10. When the windings 16 of electromagnet 10 are energized, the magnetic attraction between the members 6, 10 and 4 causes the gaps 20 and 22 to close. This closing motion inherently causes another pair of gaps to open on the left side of the apparatus. The axial thickness of each air gap, at maximum spacing, should be at least about 3/8 inch to allow a suitable length of travel, and no greater than about 7/16 inch to avoid magnetic losses.

To provide optimum speed for the quantity of energy consumed, the apparatus is provided with means for controlling the energization of the windings 14 and 16. Each of the windings includes a plurality of coils which are energized in a manner so that the initial current flow therethrough will increase rapidly, thereby enhancing a higher speed operation of the machine. For purposes of this description, the energizing means for only one of the windings 14 is described. The energizing means for the other windings 16 is identical, but it operates during the opposite phase of the machine.

Figure 2:
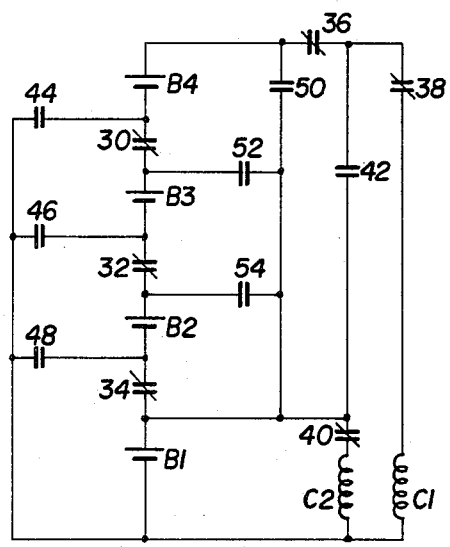
FIG. 2 is an electrical schematic drawing showing the energizing circuitry for the magnet coils during the initial portion of a phase of one of the magnets.
Figure 3:
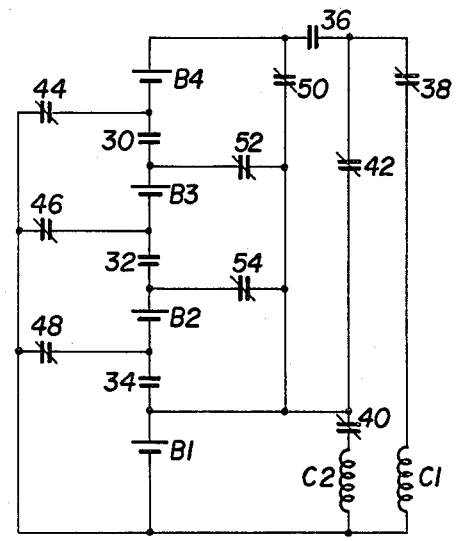
FIG. 3 is an electrical schematic drawing showing the energizing circuitry for the magnet coils during the later portion of a phase of one of the magnets.

The windings 14 include two coils C1 and C2 which are shown in FIGS. 2 and 3. These coils are connectible to four twelve-volt batteries B1, B2, B3 and B4 by a control circuit which has a plurality of switching contacts.

The purpose and operation of the control circuit is to apply a higher potential of forty eight volts to the coil C1 during an initial portion of the phase; and, during the remainder of the phase, to apply a lower potential of twelve volts to both coil C2 and coil C1. The initial higher voltage causes a rapid current rise in coil C1, and the presence of this current is effective to shorten the time required for the current in coil C2 to reach its desired level.

Figure 4:
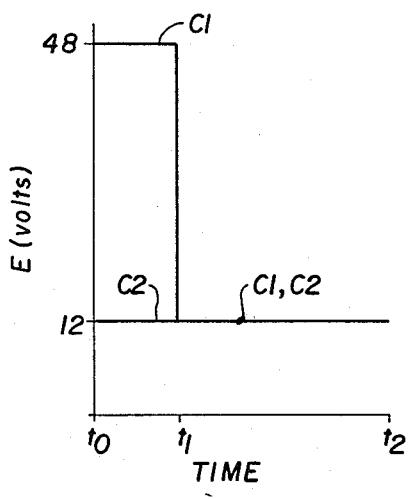
FIGS. 4 and 5 are graphs which show, respectively, the voltage and current in the windings during one phase of the machine operation.
Figure 5:
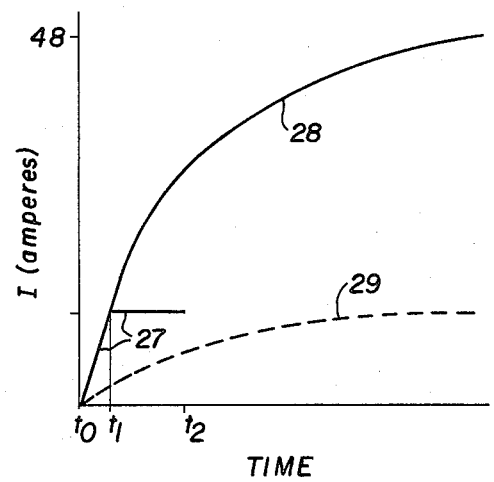

Referring to FIG. 4, it will be seen that from the time $t_0$ to $t_1$, forty eight volts are applied to C1 and twelve volts are applied to C2. From $t_1$ to the end of the stroke which occurs at $t_2$, twelve volts are applied to both coils C1 and C2. As shown in FIG. 5, the current flowing in both coils, represented by the line 27 reaches the desired level of twelve amperes at $t_1$ and remains at that level until the end of the stroke.

The time interval from $t_0$ to $t_1$ is substantially less than the time which would be required to attain a maximum current ($I_{max}$) of 48 amperes in the coil $C_1$ if the higher voltage were sustained beyond the time $t_2$. This is shown by the curve 28. The forty eight ampere value of $I_{max}$ is the quotient of the forty eight volt potential ($E_1$) and the one ohm resistance ($R_1$) of coil C1.

Due to the higher voltage energization of coil C1, the current in coil C2 rises rapidly as shown by the line 27. This is a substantially faster increase than indicated by the curve 29 which would exist if the coil C1 were not energized.

Referring back to FIGS. 2 and 3, it will be seen that the switching circuit for energizing the coils C1 and C2 is operable in one mode to connect the batteries together in series and is operable in another mode to connect the batteries together in parallel.

During the initial portion of a phase of magnet 8, from $t_0$ to $t_1$, the batteries are in series mode as shown in FIG. 2, this being provided by the closing of relay contacts 30, 32 and 34. Contacts 36 and 38 are also closed so that the forty eight volt potential of the series-connected batteries is applied to the coil C1. This condition exists from $t_0$ to $t_1$. Also it will be noted that contacts 40 are closed so that the twelve volt potential of battery B1 is applied to the coil C2.

At time $t_1$ when the current in coil C1 has become twelve amperes, contacts 36 are opened and contacts 42 are closed. The series connection between the batteries is broken by opening the contacts 30, 32 and 34, and the batteries are then connected together in parallel by closing the contacts 44, 46, 48, 50, 52 and 54. The circuit is then in the state shown in FIG. 3, with all batteries B1, B2, B3 and B4 being connected together in parallel to apply twelve volts to the coils C1 and C2 through the respective contacts 38, 40 and 42.

At the end of the phase of magnet 8, the coils C1 and C2 are deenergized by opening the contacts 38 and 40. During the machine phase when the magnet 8 is inactive, a similar circuit associated with magnet 10 is operated.

From the foregoing, it will be seen that the apparatus operates in a manner which minimizes the consumption of energy. The high voltage portion of the cycle, due to its short duration and the faster stroke, takes only as much energy from the batteries as would be required to energize the coil with one battery for an entire slower stroke of the machine. The amount of energy consumed is the same, whether the machine is operating at a low speed or at high speed.

In one system embodying the invention described hereinabove, each set of windings 14 and 16 has twenty-one coils. Each of these coils has a resistance of 0.5 ohm, and pairs of these coils are connected together in series to provide a one ohm resistance. In turn, these pairs are wired in parallel to other such pairs to form the coils C1 and C2. The number of turns in the group of coils functioning as C1 should not be so great as to produce excessive reverse current flow through the second group of coils C2 if the latter are connected to a battery. Presently, it is believed that if the system is operated with ten 12 volt batteries, the number of turns in the group of coils corresponding to C1 should be in the range of about twenty-five percent to forty percent of the total number of turns in the coils C1 and C2. For any given machine, the suitable proportions may be determined experimentally.

Rather than using batteries, it may be possible to utilize a system which has only one battery, an inverter, and a full wave rectifier. In such a system, the battery would be connected to the inverter, and the output of the inverter would be rectified to produce the higher voltage applied to the coil C1.

Persons familiar with the art will realize that the invention is susceptible to many other variations. For example, a single machine may utilize the principles described herein in association with the energy conserving system disclosed in U.S. application Ser. No. 217,928 filed Dec. 18, 1980, wherein the magnetomotive force is gradually reduced as the gap between two of the paramagnetic members is being closed. Also, it will be appreciated that energization of the coil C2 may be effected at a time other than $t_0$. Circuitry may be devised for using the same batteries for the windings 14 of magnet 8 and for the windings 16 of magnet 10. In view of the diverse forms which the invention may take, it is emphasized that the invention is not limited solely to the embodiments described herein but is embracing of a wide variety of machines which fall within the spirit of the following claims.

I claim:

1. Apparatus for producing movement, comprising,
a pair of paramagnetic members which are relatively movable from mutually distant positions to mutually proximate positions, said members being separated by a gap which opens and closes as the members move relatively away from and toward each other,
electrical windings including at least a first coil and a second coil on one of said paramagnetic members, said windings when energized being operable to provide a magnetic field which pulls the paramagnetic members together and closes the gap between them,
energizing means for applying electrical potentials to said windings, causing an electrical current to flow therethrough creating a magnetomotive force in the respective paramagnetic member, said energizing means including the following:
  (a) means for applying a first electrical potential to said first coil to produce the flow of electric current therethrough; and,
  (b) means for applying a second electrical potential to said second coil, said second electrical potential being less than said first electrical potential;
  said means (a) being operable to shorten the time required for current in the second coil to reach a given value.

2. The apparatus of claim 1 wherein the energizing means includes at least first and second electrical sources, and means (a) is operable to connect the first and second electrical sources in series to the first coil.

3. The apparatus of claim 2 wherein the means (b) of the control means connects one of said first and second electrical sources to the second coil.

4. The apparatus of claim 1 wherein the energizing means includes at least first and second electrical sources, and the means (a) is operable to connect the first and second electrical sources in series to the first coil; said means (b) being operable to connect the second coil in parallel to at least one of said electrical sources.

5. The apparatus of claim 1 wherein the energizing means includes at least first and second electrical sources, and the means (a) of the control means is operable to connect the first and second electrical sources in series to the first coil; and means (b) being operable to connect said first and second electrical sources in parallel to the second coil.

6. The apparatus of any one of claims 1-5 wherein the first means is operable for a time interval which is less than the time required to establish in the first coil a current of $I_{max} = E_1/R_1$ wherein $E_1$ is the first electrical potential and $R_1$ is the electrical resistance of the coil.

7. Apparatus for producing movement, comprising,
a pair of paramagnetic members which are relatively movable from mutually distant positions to mutually proximate positions, said members being separated by a gap which opens and closes as the members move relatively away from and toward each other,
an electrical coil on one of said paramagnetic members, said coil when energized being operable to provide a magnetic field which pulls the paramagnetic members together and closes the gap between them,
energizing means for applying electrical potentials to said coil, causing an electrical current to flow therethrough creating a magnetomotive force in the respective paramagnetic member, said energizing means including the following:
  (a) first means for applying a first electrical potential to said coil to establish the flow of electrical current therethrough, said first means being operable for a time interval which is less than the time required to establish a current of $I_{max} = E_1/R_1$ wherein $E_1$ is the first electrical potential and $R_1$ is the electrical resistance of the coil;
  (b) second means, operable after said flow of current is established, for applying a second electrical potential to said coil, said second electrical potential being less than said first electrical potential and being effective to maintain said flow of electrical current in the coil.

* * * * *